United States Patent Office 2,761,873
Patented Sept. 4, 1956

2,761,873

PREPARATION OF 4-SUBSTITUTED MERCAPTOPHENYL ALDEHYDES AND KETONES

Walter A. Gregory, Wilmington, Del., and Algird Kreuchunas, Detroit, Mich., assignors to E. I. du Pont de Nemours and Company, Wilmington, Del., a corporation of Delaware No Drawing. Application November 4, 1953,
Serial No. 390,238

7 Claims. (Cl. 260—516)

This invention relates to the preparation of 4-substituted mercaptophenyl aldehydes and ketones by processes in which an alkali metal organomercaptide is reacted with a 4-halophenyl compound containing a carbonyl group.

This application is a continuation-in-part of our co-pending application Serial No. 353,219, filed May 5, 1953, now abandoned, which in turn is a continuation-in-part of our parent application Serial No. 298,845, filed July 14, 1952, now abandoned.

The 4-substituted mercaptophenyl aldehydes and ketones produced by the processes of the present invention may be represented by the general formula

1.

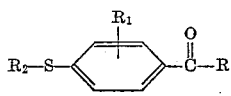

In this formula, R represents hydrogen, a lower alkyl or acylaminomethyl radical, $R_1$ represents hydrogen, halogen, a lower alkyl or a lower alkoxy radical, and $R_2$ represents an alkyl, a hydroxyalkyl, a carboxyalkyl or an aryl radical.

The preparation of the compounds of general Formula 1 in accordance with our invention can be diagrammatically represented by the following chemical equation:

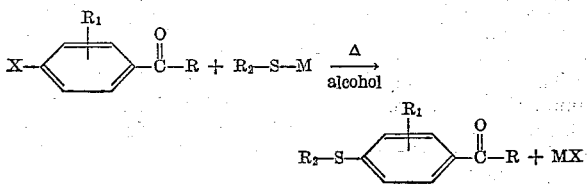

where R, $R_1$ and $R_2$ have the same significance as in Formula 1, M represents an alkali metal having an atomic number of at least 11 but no greater than 19, and X represents a chloro, bromo or iodo radical. The chemical reaction illustrated by this equation represents a nucleophylic substitution of a halogen with a mercaptide ion.

In operation of processes of the invention, a compound of the formula

2.

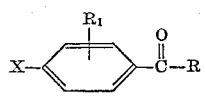

where R, $R_1$ and X have the same significance as in the chemical equation shown above, is reacted with a mercaptide of the formula 3. 

where $R_2$ and M have the same significance as in the above equation, in a liquid medium such as, for instance, an aliphatic alcohol, a glycol, dioxane, acetone and other ketones.

The preferred liquid media for carrying out the processes of our invention are aliphatic alcohols containing up to and including five carbon atoms. They can be straight-chained or branched. Ethanol and n-butanol are particularly preferred.

In accordance with the preferred embodiment of the present invention reaction between the ketone of Formula 2 and the mercaptide of Formula 3 is effected at an elevated temperature. It is preferred to heat the liquid medium containing the reactants to the temperature at which it refluxes or boils.

For practicable operation using ethanol as the solvent, the reaction mixture is preferably maintained at a temperature of from about 75° C. to 80° C. for a period of, say, one hour to twenty hours. When n-butanol is employed as a solvent, the desired reaction is effected in a temperature range of from 90° to 100° C.

Typical of the compounds of Formula 2 which may be used according to our invention are:

p-Bromophenyl methyl ketone
p-Chlorophenyl ethyl ketone
p-Iodophenyl methyl ketone
p-Chlorophenyl n-propyl ketone
2-ethyl-4-chlorophenyl methyl ketone
Methyl 2-proyl-4-iodophenyl ketone
Acetamidomethyl p-chlorophenyl ketone
Benzamidomethyl p-bromophenyl ketone
o-Carboxybenzamidomethyl p-chlorophenyl ketone
p-Chlorophenyl succinamidomethyl ketone
p-Chlorophenyl propionamidomethyl ketone
Ethyl 3-methyl-4-bromophenyl ketone
3-chloro-4-iodophenyl methyl ketone
3-methyl-4-chlorophenyl methyl ketone
3-methoxy-4-chlorophenyl methyl ketone
3-butoxy-4-bromophenyl n-propyl ketone
p-Bromobenzaldehyde
p-Chlorobenzaldehyde
p-Iodobenzaldehyde
4-chloro-2-fluorobenzaldehyde
4-chloro-2-methylbenzaldehyde
4-chloro-2-methoxybenzaldehyde
3,4-dichlorobenzaldehyde
3,4-dibromobenzaldehyde As examples of the marcaptides suitable for use in the processes of the invention there may be named:

Potassium methylmercaptide
Potassium hydroxyethylmercaptide
Potassium butylmercaptide
Potassium phenylmercaptide
Sodium p-nitrophenylmercaptide
Potassium p-chlorophenylmercaptide
Potassium tolylmercaptide
Sodium acetylmercaptide The products produced by the processes of the invention are useful as intermediate compounds in preparing synthetic drugs such as, for instance, in preparing substituted sulfonylphenylamido-1,3-propanediols, which are described and claimed in the copending application of Walter A. Gregory, Serial No. 257,986, now abandoned. The products of this invention are also useful intermediates in the preparation of fungicides and bacteriocides. Some of the compounds of the present invention are useful as corrosion inhibitors.

Illustrative of the useful products prepared in accordance with the processes of our invention are:

Methyl p-methylmercaptophenyl ketone
Ethyl p-methylmercaptophenyl ketone
Acetamidomethyl p-methylmercaptophenyl ketone
Benzamidomethyl p-ethylmercaptophenyl ketone
o-Carboxybenzamidomethyl p-methylmercaptophenyl ketone
p-Methylmercaptophenyl succinamidomethyl ketone p-Phenylmercaptophenyl propionamidomethyl ketone
Methyl p-(2-hydroxyethylmercapto)phenyl ketone
Methyl p-phenylmercaptophenyl ketone
p-Ethylmercaptophenyl n-propyl ketone
(p-Acetylphenylmercapto) acetic acid
Methyl p-(p-nitrophenylmercapto)phenyl ketone
Methyl p-(p-tolylmercapto)phenyl ketone
2-(p-acetylphenylmercapto) benzoic acid
3-methyl-4-methylmercaptophenyl methyl ketone
3-bromo-4-ethylmercaptophenyl methyl ketone
3-methoxy-4-mercaptophenyl methyl ketone
p-Methylmercaptobenzaldehyde
p-Methylmercapto-2-fluorobenzaldehyde
p-n-Butylmercapto-2-methylbenzaldehyde
p-Phenylmercaptobenzaldehyde
p-Nitrophenylmercaptobenzaldehyde
p-Methylmercapto-3-chlorobenzaldehyde
p-Hydroxyethylmercaptobenzaldehyde
p-Ethylmercaptobenzaldehyde
p-Carboxymethylmercaptobenzaldehyde In order that the invention may be beter understood reference should be had to the following specific illustrative examples:

EXAMPLE 1

*Preparation of methyl p-methylmercaptophenyl ketone*

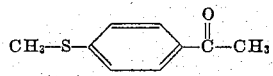

A solution of potassium methylmercaptide is prepared by dissolving 17 g. of potassium hydroxide in 250 cc. of absolute ethanol, and bubbling in 14 g. of methyl mercaptan. 49.8 g. of p-bromoacetophenone is then added to the solution of potassium methylmercaptide. The resulting solution is refluxed for a period of 3.5 hours in an oxygen free atmosphere. Potassium bromide separates from the solution at the end of about fifteen minutes. The reaction mixture is poured into 1 liter of ice and water. The desired product crystallizes and may be purified by distilling under reduced pressure, or by crystallizing from Skellysolve B. The yield of methyl p-methylmercaptophenyl ketone distilling from 110–120° at 1.3 mm. is 38 g. M. P. 66–72° C. The product is recrystallized from Skellysolve B to give white needles melting 80–81° C.

EXAMPLE 2

*Preparation of methyl p-methylmercaptophenyl ketone*

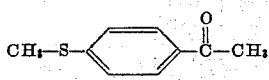

A solution of potassium methyl mercaptide is prepared by adding 14 g. of methyl mercaptan to a solution of 17 g. of potassium hydroxide in 250 cc. of absolute ethanol. 32.5 g. of p-chloroacetophenone is added to the CH₃SK solution and the resulting mixture is heated to reflux temperature for a period of fifteen hours. During the reflux period a slow stream of methyl mercaptan is bubbled in the solution. The reaction mixture is then poured upon 1 liter of ice and water. The resulting light yellow crystals consisting essentially of methyl p-methylmercaptophenyl ketone are filtered off, collected and washed with a small amount of cold water. The dried product weighs 31 g. and has a melting range of from 77 to 80° C.

EXAMPLE 3

*Preparation of ethyl p-methylmercaptophenyl ketone*

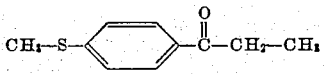

A solution of potassium methylmercaptide prepared by adding 14 g. of methyl mercaptan to 250 cc. of absolute ethanol containing 17 g. of potassium hydroxide is refluxed with 39 g. of p-chloropropiophene for a period of three hours. The reaction mixture is diluted with 1 liter of water, and the desired product extracted with chloroform. The product is distilled after removal of the chloroform. The fraction boiling 118–133° C. at 1.3 mm. is collected. This pale yellow crystalline solid comprising ethyl p-methylmercaptophenyl ketone melts at 55–58° C. and amounts to 22 g. A portion of the product crystallized from carbon tetrachloride melts at 58–60° C.

EXAMPLE 4

*Preparation of p-(2-hydroxyethylmercapto)phenyl methyl ketone*

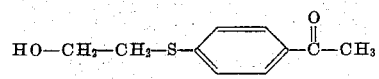

A solution of 44.8 g. of potassium hydroxide (85% minimum) in 500 cc. of absolute ethanol is stirred under nitrogen as 65 g. of 2-mercaptoethanol is added thereto. 119.4 g. of p-bromoacetophenone is then added to the ethanolic solution and the resulting mixture refluxed for a period of 20 hours. The precipitate of potassium bromide is filtered off and the alcohol removed under reduced pressure. The desired product is distilled at 1.2 mm. and boils from 170–181° C. It is a white crystalline solid melting at 55–57° C.

EXAMPLE 5

*Preparation of o-carboxybenzamidomethyl p-methylmercaptophenyl ketone*

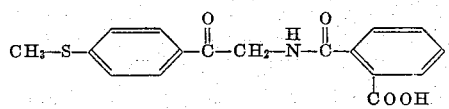

A solution of 11.2 g. of potassium hydroxide in 300 cc. of absolute ethanol is saturated with methyl mercaptan. To this there is added 24.8 g. of N-p-chlorophenacyl)-phthalamic acid and the solution is refluxed for a period of 6 hours with stirring as methyl mercaptan is slowly bubbled through. The solution is cooled and the potassium salt of the product is collected by filtration, washed with cold alcohol and then dissolved in 400 cc. water. The solution is made acid with hydrochloric acid and the product which separates is collected.

The product may be purified by dissolving in dilute ammonia and reprecipitating with mineral acid. White platelets consisting of o-carboxybenzamidomethyl p-methylmercaptophenyl ketone and melting at 165–166° C. are obtained.

*Analysis.*—Calculated for $C_{17}H_{15}NO_4S$: S, 9.73; N, 4.25. Found: S, 9.23; N, 4.27.

EXAMPLE 6

*Preparation of methyl p-phenylmercaptophenyl ketone*

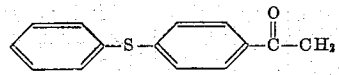

A solution consisting of 17 g. of potassium hydroxide (85% minimum), 35 g. of thiophenol, and 50 g. of p-bromoacetophenone in 500 ml. of butanol is refluxed for a period of 20 hours in a nitrogen atmosphere. The resulting solution is poured into 1 liter of ice and water. The product, methyl p-phenylmercaptophenyl ketone, is extracted with chloroform and the extract distilled. The product, which boils at 179–181° C. at 0.3 mm. pressure, is a white crystalline solid. M. P. 65–66° C.

EXAMPLE 7

*Preparation of p-methylmercaptobenzaldehyde*

A solution of potassium methyl mercaptide in ethanol is prepared by dissolving 240 g. of potassium hydroxide in 2.5 liters of absolute ethanol and saturating this solution with methyl mercaptan.

525 g. of p-chlorobenzaldehyde is added to the potassium methyl mercaptide solution. The resulting mixture is refluxed as methyl mercaptan is bubbled into the mixture for a period of three hours. A precipitate of potassium chloride separates during the reaction.

The reaction mixture is diluted with water and extracted with carbon tetrachloride. The extract is collected and distilled under reduced pressure.

The desired product distills 99–100° C. at about 1.3 mm. The product, p-methylmercaptobenzaldehyde, is an oil having the refractive index $n_D^{24.5}=1.6453$. It gives a p-nitrophenylhydrazone M. P. 182.5–184.5° C. (reported as melting 183° C. by H. H. Hodgson and F. Wm. Handley, J. Chem. Soc., 1928 1882).

We claim:

1. A process which comprises reacting a compound of the formula

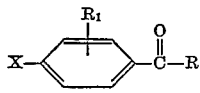

where R is a member of the group consisting of hydrogen, lower alkyl and acylaminomethyl radicals, $R_1$ is a member of the group consisting of hydrogen, halogen, lower alkyl and lower alkoxyl radicals, and X is a member of the group consisting of chloro, bromo and iodo radicals, with a compound of the formula

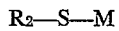

where $R_2$ is a member of the class consisting of alkyl, hydroxyalkyl, carboxyalkyl and aryl radicals and M is an alkali metal having an atomic number of at least 11 but no greater than 19, in a liquid medium to yield a compound of the formula

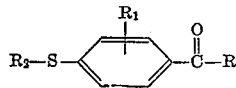

where R, $R_1$, and $R_2$ have the same significance as above.

2. In a process for preparing compounds of the formula

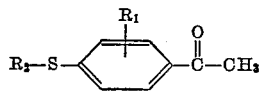

where $R_1$ is a member of the group consisting of halogen, hydrogen, lower alkyl and lower alkoxyl radicals and $R_2$ is a member of the class consisting of alkyl, hydroxyalkyl, carboxyalkyl and aryl radicals, the step comprising reacting an acetophenone of the formula

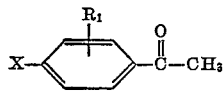

where $R_1$ has the same significance as above and X is a member of the group consisting of chloro, bromo and iodo radicals, with a compound of the formula

where $R_2$ has the same significance as above and M is an alkali metal of the group consisting of sodium and potassium, in the presence of a lower aliphatic alcohol.

3. In a process for preparing compounds of the formula

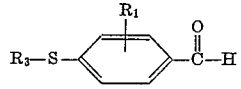

where $R_1$ is a member of the group consisting of halogen, hydrogen, lower alkyl and lower alkoxyl radicals and $R_2$ is a member of the class consisting of alkyl, hydroxyalkyl, carboxyalkyl and aryl radicals, the step comprising reacting a benzaldehyde of the formula

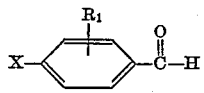

where $R_1$ has the same significance as above and X is a member of the group consisting of chloro, bromo and iodo radicals, with a compound of the formula

where $R_2$ has the same significance as above and M is an alkali metal of the group consisting of sodium and potassium, in the presence of a lower aliphatic alcohol.

4. In a process for preparing methyl p-methylmercaptophenyl ketone, the step comprising reacting p-chloroacetophenone with potassium methylmercaptide in the presence of ethanol.

5. In a process for preparing methyl p-methylmercaptophenyl ketone, the step comprising reacting p-chloroacetophenone with potassium methylmercaptide in the presence of n-butanol.

6. In a process for preparing o-carboxybenzamido p-methylmercaptophenyl ketone, the step comprising reacting N-(p-chlorophenacyl) phthalamic acid with potassium methylmercaptide in the presence of ethanol.

7. In a process for preparing p-methylmercaptobenzaldehyde, the step comprising reacting p-chlorobenzaldehyde with potassium methyl mercaptide in the presence of ethanol.

References Cited in the file of this patent

UNITED STATES PATENTS

| | | |
|---|---|---|
| 2,017,208 | Johnson | Oct. 15, 1935 |
| 2,410,431 | Donleavy | Nov. 5, 1946 |
| 2,506,019 | Goldberg et al. | May 2, 1950 |

OTHER REFERENCES

Richter's Organic Chemistry, 3rd English Edition, vol. 1, page 172.